(12) United States Patent
Jana et al.

(10) Patent No.: US 10,511,869 B2
(45) Date of Patent: *Dec. 17, 2019

(54) SYSTEM FOR CONSOLIDATING HETEROGENEOUS DATA CENTERS THROUGH VIRTUALIZATION OF SERVICES

(71) Applicant: AT&T Intellectual Property I, L.P., Atlanta, GA (US)

(72) Inventors: Rittwik Jana, Montville, NJ (US); Vaneet Aggarwal, West Lafayette, IN (US); Xu Chen, New Providence, NJ (US); Vijay Gopalakrishnan, Edison, NJ (US); Kadangode Ramakrishnan, Riverside, CA (US); Vinay Vaishampayan, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 436 days.

This patent is subject to a terminal disclaimer.

(21) Appl. No.: 15/352,998

(22) Filed: Nov. 16, 2016

(65) Prior Publication Data

US 2017/0064350 A1    Mar. 2, 2017

Related U.S. Application Data

(63) Continuation of application No. 13/218,237, filed on Aug. 25, 2011, now Pat. No. 9,516,368.

(51) Int. Cl.
*G06F 15/173* (2006.01)
*H04N 21/238* (2011.01)
(Continued)

(52) U.S. Cl.
CPC ..... *H04N 21/23805* (2013.01); *G06F 9/5038* (2013.01); *H04N 21/26216* (2013.01);
(Continued)

(58) Field of Classification Search
USPC .............. 709/226, 231, 232, 233, 235, 236
See application file for complete search history.

(56) References Cited

U.S. PATENT DOCUMENTS

| 9,128,766 | B1 | 9/2015 | Herington et al. |
| 2007/0250838 | A1 | 10/2007 | Belady et al. |

(Continued)

OTHER PUBLICATIONS

Aggarwal et al., "Exploiting Virtualization for Delivering Cloud-based IPTV Services," Computer Communications Workshops (INFOCOM WKSHPS), 2011, document of 6 pages.

*Primary Examiner* — Lan Dai T Truong
(74) *Attorney, Agent, or Firm* — Akerman LLP; Michael K. Dixon; Mammen (Roy) P. Zachariah, Jr.

(57) ABSTRACT

A system for resource provisioning for content delivery of multiple services is disclosed. The system may be configured to offer multiple services, wherein at least one first offered service is delivery of prerecorded content and at least one second offered service is content delivered according to a deadline. In at least one embodiment, the first offered service may be video content, and the second offered service may be broadcast television content. The system may also be configured to deliver at least a portion of the first offered service in advance of use of that portion of the first offered service such that resource demand in connection with delivery of service content of the second offered service at peak delivery may be reduced. As such, fewer resources are needed to provide uninterrupted service of the first and second offered services.

20 Claims, 3 Drawing Sheets

(51) Int. Cl.
    *G06F 9/50*      (2006.01)
    *H04N 21/262*    (2011.01)
    *H04N 21/266*    (2011.01)
    *H04N 21/433*    (2011.01)
    *H04N 21/61*     (2011.01)
    *H04N 21/647*    (2011.01)
    *H04N 21/6543*   (2011.01)

(52) U.S. Cl.
    CPC ... *H04N 21/26616* (2013.01); *H04N 21/4331* (2013.01); *H04N 21/6125* (2013.01); *H04N 21/64738* (2013.01); *H04N 21/6543* (2013.01); *G06F 2209/506* (2013.01)

(56) References Cited

U.S. PATENT DOCUMENTS

2009/0300607 A1  12/2009  Ferris et al.
2010/0058405 A1   3/2010  Ramakrishnan et al.
2012/0259977 A1  10/2012  Gerovac et al.

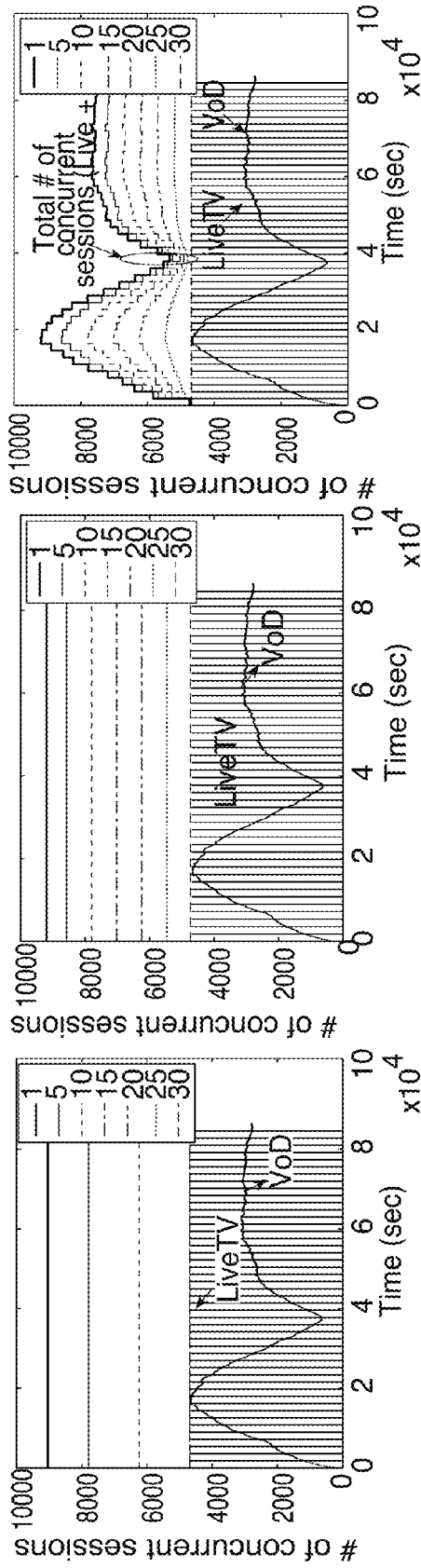
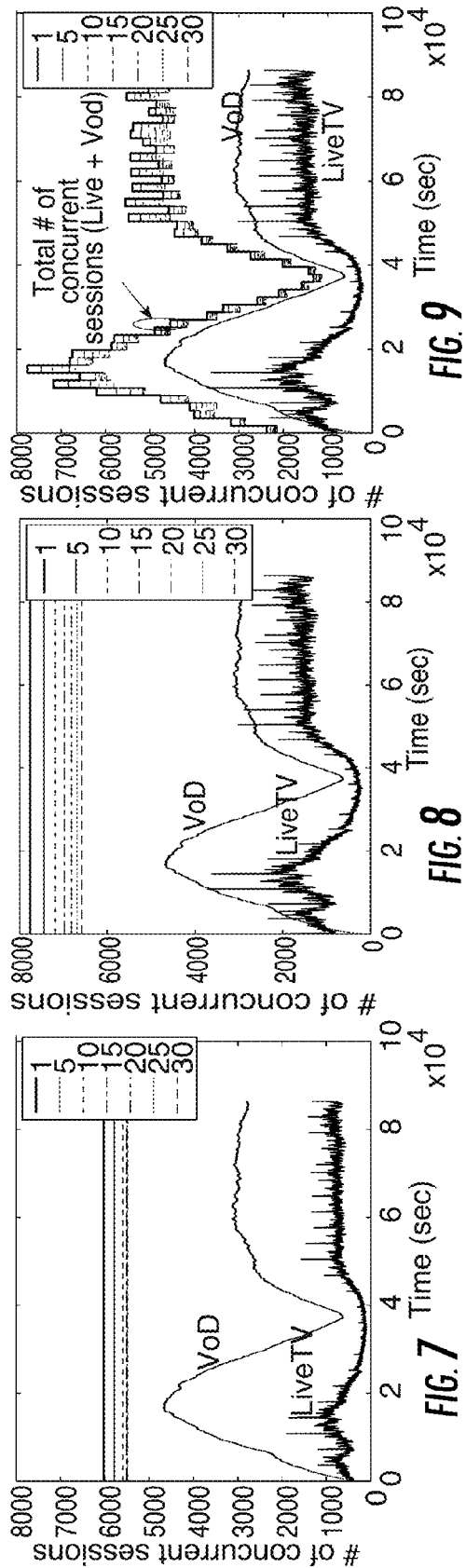

SYSTEM FOR CONSOLIDATING HETEROGENEOUS DATA CENTERS THROUGH VIRTUALIZATION OF SERVICES

CROSS-REFERENCES TO RELATED APPLICATIONS

This application is a continuation of and claims priority to U.S. patent application Ser. No. 13/218,237, filed Aug. 25, 2011, which is hereby incorporated by reference in its entirety.

FIELD OF THE INVENTION

The present application relates to network virtualization and, more particularly, to a system for exploiting virtualization for delivering cloud based services using minimal resources through time shifting of service provisioning to handle peak demand.

BACKGROUND

As Internet Protocol television becomes more popular, the demands placed upon the service provider's resources have increased without any relief in sight. Service providers have provisioned for the peak demands of each service by all users according to their different needs. However, provisioning for peak demands leaves resources under utilized at nearly all times because none of the resource demands from users for these services is constantly or concurrently at a peak demand Thus, while the end user is provided a service without delay, an unnecessary amount of resources, such as servers and the like, is committed to the provisioning of services.

Transient bandwidth demand for internet protocol live television originates from clients switching channels. This transient demand, which spikes in bursts, is often significant in terms of both bandwidth and server I/O capacity. Currently, this demand is served by large numbers of servers grouped in server farms for serving individual applications that are scaled as the number of user increases.

SUMMARY

A system for resource provisioning for content delivery of multiple services is disclosed. The system may be configured to offer multiple services, wherein at least one first offered service is delivery of prerecorded content and at least one second offered service is content delivered according to a deadline. In at least one embodiment, the first offered service may be video content, and the second offered service may be broadcast television content. The system may also be configured to deliver at least a portion of the first offered service in advance of use of the first offered service such that resource demand in connection with delivery of service content of the second offered service at peak delivery may be reduced. As such, fewer resources are needed to provide uninterrupted service of the first and second offered services.

A method of resource provisioning for content delivery of multiple services may include offering multiple services, wherein one or more first offered services is delivery of prerecorded content and one or more second offered services is content delivered according to a deadline and delivering at least a portion of the first offered service in advance of use of the first offered service such that combined resource demand in connection with delivery of service content of the at least one second offered service at peak delivery is reduced. The method may also include temporarily suspending delivery of at least a portion of the first offered service such that demand for resources during delivery of the second offered service is reduced and use of the first offered service goes uninterrupted. Resources can be switched from the first offered service to the second offered service without any interruption to both consumers of the two services. Resource provisioning may include dynamically adjusting resources provided to deliver the second offered service while delaying delivery of the first offered service. During suspension of delivery of the first offered service, the capability of the receivers (e.g., consumers) may be used to cache the content that has been transmitted in advance. As an example, delaying delivery of the first offered service may include delaying delivery for less than 30 seconds. Dynamically adjusting resources may include dynamically adjusting amount of servers needed to meet demand for delivery of the second offered service while delaying delivery of the first offered service. In one embodiment, the first offered service may be content without a playback deadline, and the second offered service may be content with a playback deadline. In particular, the first offered service may be video content, such as video on demand content, without a playback deadline or with a lax playback deadline that is later in time than a deadline for the second offered service, and the second offered service may be broadcast television content with a playback deadline. In particular, instant channel change (ICC) workload that occur as a result of users changing channels need to be serviced with stringent time constraints. As such, the delivery of the video content, such as video on demand content, can be delivered earlier than needed and stored, thereby making resources available for transmission of the broadcast television, such as ICC. Unlike the prerecorded video content, such as video on demand, live television content cannot be transmitted in advance.

The method of resource provisioning may also include establishing additional virtual machines in anticipation of an increase in demand of the second offered service. A virtual machine is a software implementation of a machine that executes programs like a physical machine. Establishing virtual machines in anticipation of an increase in demand of the second offered service may include establishing virtual machines in anticipation of an increase in demand of the second offered service about 30 seconds before an anticipated demand increase. The method may also include determining a number of servers needed based upon a peak of sums of individual workloads of the delivery of the first offered service and the second offered service. Delivering at least a portion of the first offered service in advance of use of the first offered service may include delivering the at least one first offered service via a unicast stream. In addition, delivering at least a portion of the first offered service in advance of use of the first offered service such that resource demand in connection with delivery of service content of the second offered service at peak delivery is reduced may include delivery of service content of the second offered service via a unicast stream. Delivering at least a portion of the first offered service in advance of use of the first offered service may include delivering the portion of the first offered service to a storage device, such as, but not limited to, a set-top box and storing the portion of the first offered service on the set-top box.

A system for resource provisioning for content delivery of multiple services may include a first device configured to offer multiple services, wherein at least one first offered service is delivery of prerecorded content without a playback deadline or with a lax playback deadline that is later in time than a deadline for the second offered service, and at least one second offered service is content delivered according to a deadline. The first device may also be configured to deliver at least a portion of the first offered service in advance of use of the first offered service such that resource demand in connection with delivery of service content of the second offered service at peak delivery is reduced. The first device may be configured to temporarily suspend delivery of at least a portion of the first offered service such that demand for resources during delivery of the second offered service is reduced and use of the first offered service goes uninterrupted. The first device may be configured to dynamically adjust resources provided to deliver the second offered service while delaying delivery of the first offered service. The first device may be configured to deliver at least a portion of the first offered service in advance of use of the first offered service such that resource demand in connection with delivery of service content of the second offered service at peak delivery is reduced, wherein the first offered service is video content without a playback deadline or with a lax playback deadline that is later in time than a deadline for the second offered service, and the second offered service is broadcast television content with a playback deadline. The first device may be configured to establish virtual machines in anticipation of an increase in demand of the second offered service by establishing virtual machines in anticipation of an increase in demand of the second offered service about 30 seconds before an anticipated demand increase. The first device may be configured to determine a number of servers needed based upon a peak of sums of individual workloads of the delivery of the first offered service and the second offered service.

The system may also include a computer-readable medium formed from instructions, which, when loaded and executed by an electronic processor, causes the electronic processor to transfer data between devices, according to the instructions of offering multiple services, wherein at least one first offered service is delivery of prerecorded content and at least one second offered service is content delivered according to a deadline. The medium further processes instructions including delivering at least a portion of the first offered service in advance of use of the first offered service such that resource demand in connection with delivery of service content of the second offered service at peak delivery is reduced.

These and other features of the resource provisioning system are described in the following detailed description, drawings, and appended claims.

BRIEF DESCRIPTION OF THE DRAWINGS

FIG. 4 is a graph of a total number of sessions that need to be accommodated with a 15 second broadcast television with instant channel change pulse width via a synthetic trace.

FIG. 5 is a graph of a total number of sessions that need to be accommodated with a 30 second broadcast television with instant channel change pulse width via a synthetic trace.

FIG. 6 is a graph of a total number of concurrent sessions of multiple services, such as broadcast television and recorded content, such as video on demand, needed to be supported with a 30 second hold time for recorded content via synthetic broadcast television measurement trace and computed with an optimization algorithm every 30 minutes.

FIG. 7 is a graph of a total number of sessions that need to be accommodated with a 15 second broadcast television with instant channel change pulse width via an operational measurement trace.

FIG. 8 is a graph of a total number of sessions that need to be accommodated with a 30 second broadcast television with instant channel change pulse width via an operational measurement trace.

FIG. 9 is a graph of a total number of concurrent sessions of multiple services, such as broadcast television and recorded content, such as video on demand, needed to be supported with a 30 second hold time for recorded content via operational broadcast television measurement trace and computed with an optimization algorithm every 30 minutes.

DETAILED DESCRIPTION OF THE INVENTION

Figure 1:
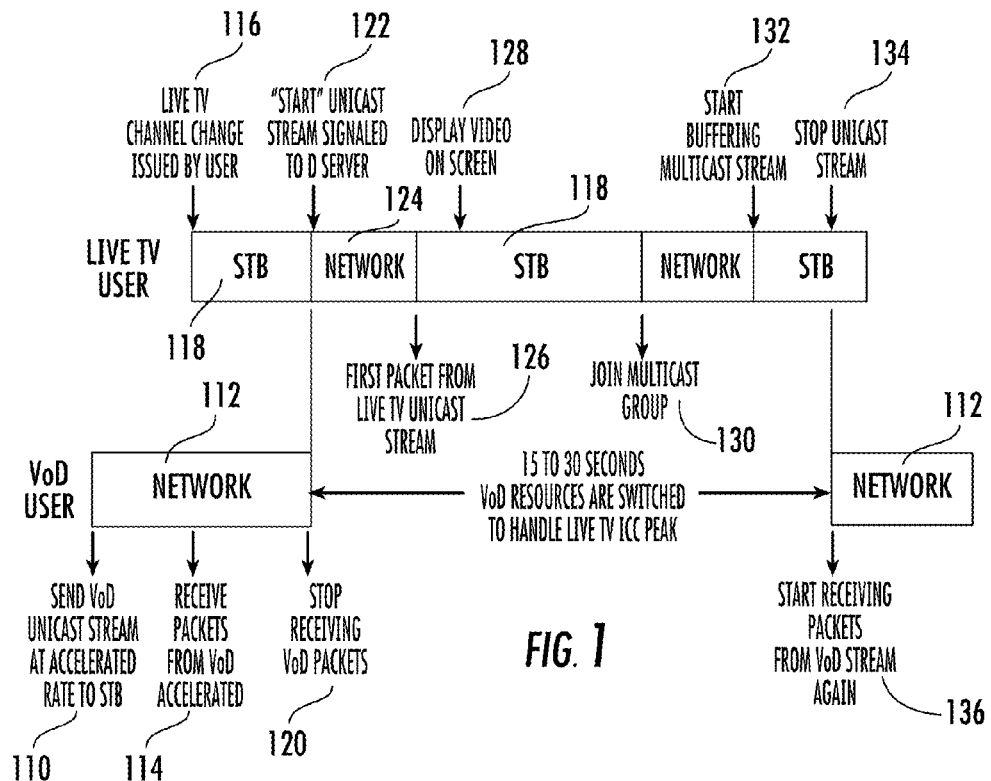
FIG. 1 is a schematic diagram of a packet buffering timeline for a system for resource provisioning for content delivery of multiple services, including, but not limited to, broadcast television and recorded video content, such as video on demand.

As shown in FIGS. 1-9, a system 10 for resource provisioning for content delivery of multiple services is disclosed. The system 10 may be configured to offer multiple services, wherein at least one first offered service is delivery of prerecorded content and at least one second offered service is content delivered according to a deadline. In at least one embodiment, the first offered service may be video content, and the second offered service may be broadcast television content. The system 10 may also be configured to deliver at least a portion of the first offered service in advance of use of the first offered service such that resource demand in connection with delivery of service content of the second offered service at peak delivery may be reduced by temporarily suspending delivery of the first offered service while the resource demand is at a peak. As such, fewer resources are needed to provide uninterrupted service of the first and second offered services in contrast to conventional systems configured to handle peak demand for both services independently.

The system 10 may be configured to offer multiple services, wherein at least one first offered service is delivery of prerecorded content and at least one second offered service is content delivered according to a deadline. The system 10 may handle the real time aspect of entertainment content by provisioning resources to handle peak demand. The system 10 may do so, by delivering at least a portion of the first offered service in advance of use of the first offered service such that resource demand in connection with delivery of service content of the second offered service at peak delivery is reduced. In at least one embodiment, the system 10 may temporarily suspend delivery of at least a portion of the first offered service such that demand for resources during delivery of the second offered service is reduced and use of the first offered service goes uninterrupted.

The system 10 may further dynamically adjust resources provided to deliver the second offered service while delaying delivery of the first offered service. Delaying delivery of the first offered service may include delaying delivery for less than 30 seconds. The system 10 may be configured to dynamically adjust the number of servers needed to meet demand for delivery of the at least one second offered service while delaying delivery of the at least one first offered service.

In at least one embodiment, the system 10 is configured such that the first offered service is content without a playback deadline or with a lax playback deadline that is later in time than a deadline for the second offered service, and the second offered service is content with a playback deadline. In particular, the first offered service may be prerecorded video content without a playback deadline or with a lax playback deadline that is later in time than a deadline for the second offered service, and the second offered service may be broadcast television content with a playback deadline. Video typically has a relatively steady load and imposes delay bounds. Broadcast television, such as instant channel change, is very peaky in that broadcast television uses resources only for a very short period of time. The system 10 may be configured such that delivering at least a portion of the first offered service in advance of use of the first offered service may include delivering the first offered service via a unicast stream. The system 10 may also be configured such that delivering at least a portion of the first offered service in advance of use of the first offered service such that resource demand in connection with delivery of service content of the second offered service at peak delivery is reduced comprises delivery of service content of second offered service via a unicast stream. The system 10 may also be configured such that delivering at least a portion of the first offered service in advance of use of the first offered service includes delivering the portion of the first offered service to a set-top box 12 and storing the portion of the first offered service on the set-top box 12.

The system 10 may include establishing additional virtual machines in anticipation of an increase in demand of the second offered service. In one embodiment, virtual machines may be established in anticipation of an increase in demand of the second offered service about 30 seconds before an anticipated demand increase. Thus, the system 10 may adjust for an anticipated increase resource demand. This may result in a corresponding reduction in the number of virtual machines allocated to the first offered service.

The system 10 may also optimize the resource requirements at any given time. The system 10 may optimize the minimum number of servers needed based on the peak of sums of two individual workloads of delivery of the first and second offered services. This configuration reduces the total number of servers required in contrast to the simple alternative approach of having separate infrastructures serving each service. In such an alternative approach, the number of servers required would be the sum of the peaks for each service's resource requirements. In particular, the system 10 may determine the minimum number of servers needed based upon a peak of sums of individual workloads of the delivery of the first offered service and the second offered service. The amount of server resources required as the deadline constraint is varied is discussed. The benefit of multiplexing diverse services on a common infrastructure, and how dynamically adjusting the resources provided to a particular service while delaying the other service can bring significant savings in resource requirements in comparison to provisioning resources for each of the services independently is discussed as well. Such determination of resource provisioning provides the amount of cloud resources required with multiple real-time services in the cloud infrastructure, as shown in FIGS. 4-9.

To estimate the server requirement for a single offered service, a sequence of time instants during which a number of requests arrive to an incoming queue may be denoted by $c(n)$ for $n=1, \ldots N$. Each request may have a deadline of m time units to be completely served after its arrival. Server capacity may be determined so that all the requests arriving at each of the n time instants are served with no request missing its deadline.

When $m=0$, no request has any delay, and thus the number of servers that are needed is exactly the peak of $c(n)$ ($\max_{1 \leq n \leq N} c(n)$). The trade-off between the number of servers needed and the deadline constraint tolerable. In addition, it is assumed that all the requests arriving within a time interval N have to be served within the same time interval.

The following theorem gives the number of servers needed to serve the requests within their deadline.

Theorem 1:

The incoming arrivals to a queue are time i is $c_i$, $1 \leq i \leq N$. Each of the requests arriving at time i has a deadline of $\min(i+m,N)$. In this case, the number of servers given by, $$S = \left\lceil \max\left\{ \max_{1 \leq i \leq i+j \leq N-m} \frac{\sum_{n=i}^{i+j} c(n)}{m+j+1}, \max_{0 \leq k \leq N} \frac{\sum_{j=0}^{k} c(N-j)}{k+1} \right\} \right\rceil, \quad (1)$$

is necessary and sufficient to serve all the incoming requests. In the event there is no restriction on all the requests being served by time N, such situation is equivalent to lengthening the process $c(i)$ to a length N+m arrival process where $c(i)=0$ for $i>N$, which results in the following corollary.

Corollary 2:

The incoming arrivals to a queue are time i is $c_i$, $1 \leq i \leq N$, and no request is arriving for times $i>N$. Each of the requests arriving at time i has a deadline of i+m. In this case, the number of servers given by, $$S = \left\lceil \max_{1 \leq i \leq i+j \leq N-m} \frac{\sum_{n=i}^{i+j} c(n)}{m+j+1} \right\rceil, \quad (2)$$

is necessary and sufficient to serve all the incoming requests.

Corollary 3:

When the service cannot have any delay, (or $m=0$), the number of servers that is necessary and sufficient is given by $\max_{1 \leq n \leq N} c(n)$.

The proof of Theorem 1 and the necessity of S servers are shown below. There are $c(j)$ requests arriving at time j and at most S requests can leave the queue. If $\Sigma_{n=i}^{i+j} c(n) > (m+j+1)S$, the number of requests arriving from times [i, i+j] cannot have departed in m+j+1 time starting from time i. Thus, some requests will miss the deadline. So, $\Sigma_{n=i}^{i+j} c(n) \leq (m+j+1)S$, for all $i+j \leq N-m$. Further, if $\Sigma_{j=0}^{k} c(N-j) > (k+1)S$, the requests arriving in last k+1 time would not have gone out of the queue. Thus, $\Sigma_{j=0}^{k} c(N-j) \leq (k+1)S$ for all $k<N$. Thus, the expression of S given in theorem 1 is necessary.

The number of servers given in theorem 1 is sufficient. In particular, for the achievability, a first-in-first-out (FIFO) strategy for servicing the queue is used. The first S packets in the queue are served at each time based on FIFO strategy if there are more than S packets waiting in the queue. If there are less than S packets in the queue, all the requests are served. As shown below, with S given as in theorem 1 and using this strategy, no request misses the deadline.

With a time instant i, the last time before that the queue becomes empty is j−1. As such, there exists such point since the queue was empty at 0 and hence this point would be last if there was nothing else in between. If i<j+m, then the packets that have arrived from j to i have not missed deadline yet. If i≥j+m, the packets that should have departed from time j to i should be at-least $\Sigma_{n=j}^{i-m}c(n)$ and since this is ≤(m+1+i−m−j)S=(i−j+1)S, these packets would have departed. Thus, no request from time j to i has missed a deadline. This is true for ally i, j that have deadline m time units away.

But, after the last time j−1 when the queue becomes empty, it should be determined if all the requests have been served by time N since the deadline for some packets here would be more stringent. Let j−1 be the last time instance when the queue becomes empty. Then, from that point, the number of packets that entered the queue are $\Sigma_{n=j}^{N}c(n)$. This is ≤(N−j+1)S which are packets that can depart from time j to time N. Thus, there are no packets remaining to be served after time N.

To estimate the server requirement for multiple services, let there be k services $c_1(i), \ldots c_k(i)$ for 1≤i≤N. Each of these services has a deadline associated for the requests, service $c_j$ with deadline constraint $m_j$. In this case, the number of servers needed are given in the following theorem.

Theorem 4: There are k arrival processes $c_j(i)$ for 1≤j≤k and 1≤i≤N to a queue at time i. Request $c_j(i)$ arriving at time i has a deadline of min(i+$m_j$,N). In this case, the number of servers given by $$S = \left\lceil \max\left\{ \max_{1 \leq i \leq i+j \leq N, i \geq min(m_1,\ldots,m_k)} \frac{\sum_{j=i}^{k}\sum_{n=i}^{i+i-m_j} c_j(n)}{i+1}, \max_{0 \leq k \leq N} \frac{\sum_{j=1}^{k}\sum_{i=0}^{i} c_j(N-i)}{l+1} \right\} \right\rceil, \quad (3)$$

is necessary and sufficient to serve all the incoming requests.

In case there are no restrictions on all the requests being served by time N, this is equivalent to lengthening each incoming processes to a length N+max($m_1, \ldots, m_k$) arrival process where $c_j(i)$=0 for i>N, which gives us the following corollary.

Corollary 5:
There are k arrival processes $c_j(i)$ for 1≤j≤k and 1≤i≤N to a queue at time i, and no request is arriving for times i>N. Request $c_j(i)$ arriving at time i has a deadline of i+$m_j$. In this case, the number of servers given by, $$S = \left\lceil \max_{1 \leq i \leq i+j \leq N, i \geq min(m_1,\ldots,m_k)} \frac{\sum_{j=i}^{k}\sum_{n=i}^{i+i-m_j} c_j(n)}{i+1} \right\rceil, \quad (4)$$

is necessary and sufficient to serve all the incoming requests.

Corollary 6:
When none of the services can have any delay, (or $m_j$=0), the number of servers that is necessary and sufficient is given by $\max_{1 \leq n \leq N}\Sigma_{j=1}^{k}c_j(n)$. The proof of necessity follows along the same lines as the proof of theorem 1. For the sufficiency, the strategy of Earliest Deadline Scheduling was used rather than FIFO, which provides that the requests be sorted by deadline, and if there are less than S requests, serve all and otherwise serve the first S requests. Similar steps prove that none of the requests miss a deadline with this strategy.

An Exemplary Embodiment of the Resource Provisioning System Usable with IP Television In one example, the system 10 may be used to provide on demand services including video and broadcast television, which may be, but are not limited to being, video on demand and live television with instant channel changes. Let us examine the architecture of an IPTV infrastructure that has been deployed nationwide to support both live broadcast TV and Video-On-Demand (VOD) delivery.

Figure 2:
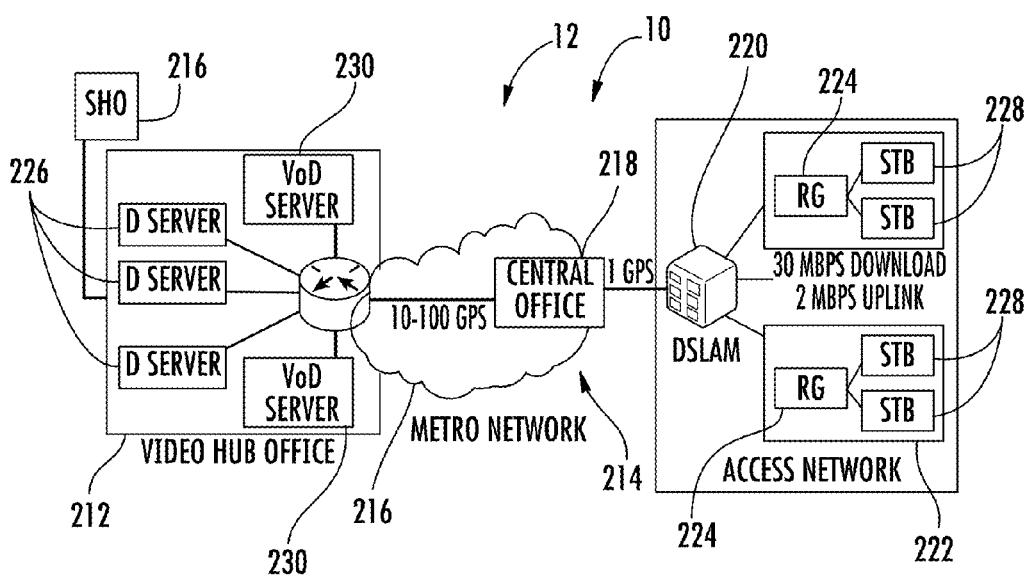
FIG. 2 is a schematic diagram of a system for resource provisioning for content delivery of multiple services, including, but not limited to, broadcast television and recorded video content, such as video on demand.

As shown in FIG. 2, the system 10 may include an infrastructure-assisted solution, where a multicast-capable IP backbone is used for distributing video content. A limited number (possibly even one with a second for redundancy) of Super Head End Offices 210 (SHOs) acquire programming or content, and distribute the content to the various Video Hub Offices 212 (VHOs) each of which may serve a designated market area 214. Content is also acquired at the VHO locations 212 for localized content, e.g., advertising, local channels, municipal channels etc. The network 216 from the VHO 212 to the individual consumer consists of a hierarchical IP network that is used to aggregate subscribers over two levels, eventually going to a set of central offices 218 (CO) in the metropolitan area 214 (in a telecommunication providers infrastructure). Downstream from the COs 218 are connections to the access nodes typically employing fiber to the premise (FTTP) or fiber to the node (FTTN). In a FTTN deployment GigE fiber connections are used to connect the COs 218 to a set of access nodes, e.g., a Digital Subscriber Line Access Multiplexer 220 (DSLAM) in a DSL access network 222.

All IP services in the home are accessed via a Residential Gateway 224 (RG) which provides a managed interface between the customer premises equipment and the providers network infrastructure. Networking within a home may use different technologies. Video services are eventually delivered to one or more set-top boxes (STB) connected directly to the RG. Typical video streaming rates are 2 Mbps for standard definition (SD) and 6.5 Mbps for high definition (HD). Video on demand content is also streamed at a minimum of the SD rate. One challenge in the arena of video distribution over the access network 216 is the available uplink and downlink capacities and rates in that portion of the network 216. The system 10 solves the scalability challenges in the infrastructure of the VHO 212 which includes a large number of servers 226 that are deployed for delivering broadcast television and video on demand content.

Typically, broadcast television is multicast from distribution servers (D-servers) 226 using IP Multicast with one group per TV channel. However, supporting instant channel change (ICC) requires a unicast stream to each STB 228 for a short period of time and poses a significant scalability challenge. When a user tunes to a TV channel by joining a particular multicast group for that channel, the content has to be delivered to the STB 228 and fill its playout buffer. To keep the switching latency small to satisfy the desired user experience, this unicast stream has to be delivered at a higher rate than the streaming rate of the video. The playout point may in fact comprise a few seconds of video to be played out to accommodate all the variability observed in the video delivery system. The video is delivered to the STB 228 up to the playout point and only after that is the video delivered to the television display. Although there are several solutions to mitigate the switching latency and realize instant channel change for the user, the system 10 is configured to deliver the video content for the new channel at an accelerated rate using a unicast stream from the server at the VHO 212. The playout buffer is thereby filled quickly, and keeps switching latency small. Once the playout buffer is filled up to the playout point, the STB 228 joins the multicast group to receive content, without continuing to impose a load on an individual basis on the VHO 212 server complex. Other than instant channel change, live broadcast television has a significant multicast component and supporting live broadcast television multicast requires, relatively, smaller amounts of VHO 212 server resources.

The primary scalability challenge for live broadcast television is the server resources for instant channel change. Instant channel change adds a transient demand proportional to the number of users concurrently initiating a channel change event. A dramatic burst load that is placed on the distribution servers (D-servers) 226 by correlated channel change requests from users. This results in very large peaks occurring on every half-hour and hour boundaries. The peak to average ratio can be multiple orders of magnitude and these peaks last for a few seconds (of the order of 10-30 seconds, required to fill the playout buffer). As a result, the D-servers 226 are over-provisioned for the majority of the time. The system 10 smoothes out this load spike on the D-servers 226 and share the D-servers 226 at non-peak instants to provide other services. Video-on-Demand (VoD) requires a relatively small number of servers 230. Each VoD request is satisfied with a unicast stream. While VoD servers 230 also experience varying load from the subscriber population, the load is somewhat steady over these time scales of a half-hour or one-hour intervals. The receiving set-top boxes 228 (STBs) also have sufficient storage to be able to buffer several seconds, or even minutes of video in high-speed memory. By adapting the VoD delivery rate from the servers 230 and pre-buffering the VoD content on the STB 228, the unavailability of the servers 230 for short time intervals can be easily accommodated. As such, the servers 230 may be used to deliver live broadcast television instant channel change requests. Thus, the system 10 is configured to share servers 230 and 226 for both live broadcast television and video on demand content a common server complex 212. The system 10 may be used with existing technology without having to modify the source code for conventional video on demand servers.

Figure 3:
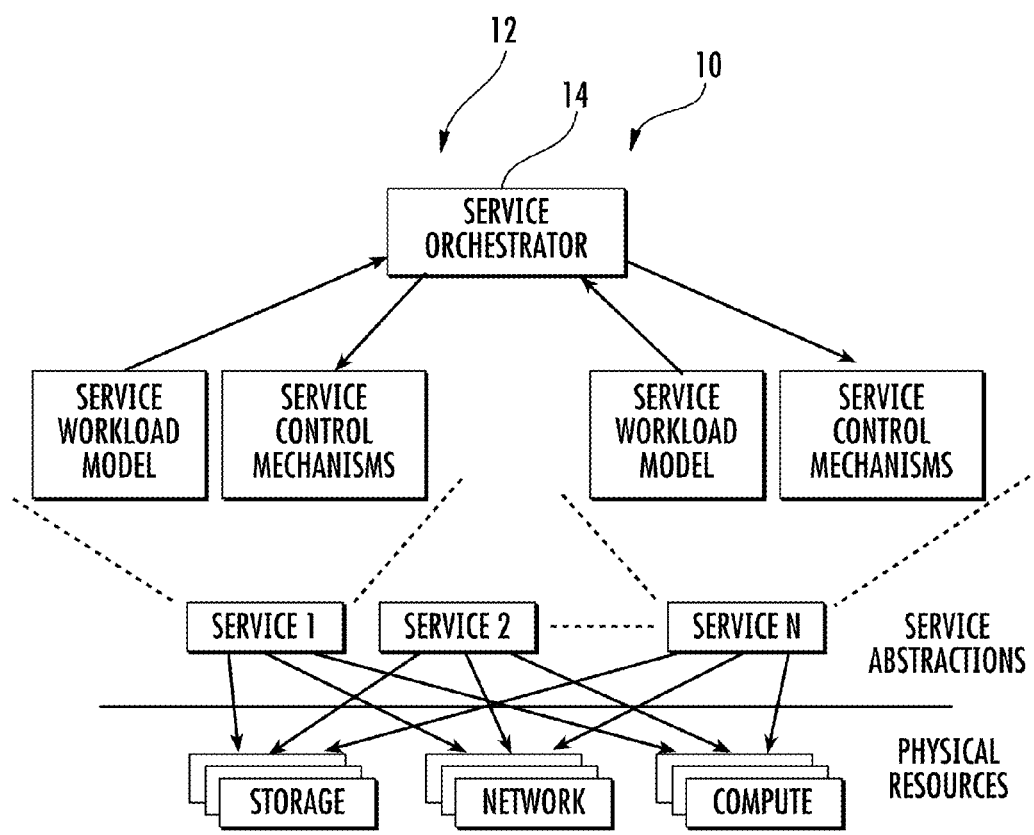
FIG. 3 is a schematic diagram of a system for resource provisioning for content delivery of multiple services through a virtual network.

FIG. 3 discloses a cloud-based architecture for providing on-demand services. Each service may have a dynamic pool of resources, including computer, network, and storage, which are allocated from cloud providers.

The system 10 may host all the IP television services while minimizing the total resource needed by manipulating individual services to adapt to the real-time workload. For each service, a workload model may be established that predicts the volume of incoming requests over time and thus, the resource needed at a given point in time to satisfy these requirements. Such prediction can be based on historical data analysis, external event hints, etc. In the context of IP television, apart from the regular diurnal pattern that exists for all services, broadcast television with instant channel change has a large number of correlated requests arriving periodically. In addition, the system 10 enables each service to expose a set of control mechanisms for varying the resource requirements without sacrificing service quality. For example, a video on demand service can speed up the content delivery rate for ongoing sessions and then temporarily suspend content delivery of the video on demand content to be delivered. As such, the server I/O and network bandwidth needed for a first offered service for a future time period may be reduced. This frees up resources that can used for other services, for example, a predictable influx of broadcast TV with instant channel change requests. Virtualization enables many of these control mechanisms. For example, after speeding up video on demand content delivery, the video on demand-related virtual machines may be paused and virtual machines may be dynamically allocated to handle the broadcast television with instant channel change workload.

For example, as shown in FIG. 1, a unicast stream of video on demand content may be sent at an accelerated rate to a storage device, such as, but not limited to, a set-top box, at 110. The network 112 may receive packets of video on demand content at 114. A user may issue a channel change request of broadcast television at 116 at a storage device, such as a set top box, 118. A system associated with a video on demand user may stop receiving video on demand packets at 120, thereby temporarily suspending video content delivery for between 15 and 30 seconds so that resources may be committed to broadcast television content delivery. The set top box 118 may start a unicast stream signaled to a server at 122. The network 124 may send a first packet of broadcast television to the set top box 118 at 126. Video content may be displayed on a screen at 128. A multicast group is joined at 130, and multicast stream begins to be buffered at 132. The unicast stream is stopped at 134. The network 112 starts receiving packets from video on demand content at 136.

As shown in FIG. 3, the device 12 may be a service orchestrator 14 that may take the individual workload models of all the services as input. Effectively, the service orchestrator 14 may act as an overseer that understands the resource requirements of each service, and decides on the adaptation methods to reduce the overall resource consumption, which may be addressed as an optimization problem, as shown in FIGS. 4-9. In particular, the service orchestrator 14 may divide the continuous time domain into bins that start on $T_0, T_1, \ldots$. At the beginning of a time bin $T_s$, the service orchestrator 14 may first execute scheduled operations for that bin, such that the allocated resources for each service are updated. Based on the most recent workload model prediction, the service orchestrator 14 may then add or modify scheduled operations on $T_j$ (j>i).

Each time bin represents a duration during which each service operates on a fixed set of resources, because resource modification only happens at the beginning of each bin. A short bin duration allows more adaptiveness to the dynamic workload, but potentially introduces higher system variability and higher optimization workload on the service orchestrator 14. Longer bins reduce optimization workload, but unavoidably lead to sub-optimal service delivery due to slow response to workload change. The service manipulation decision made at the beginning of each time bin is a complex optimization process. It may become impractical (due to modeling complexity) and unnecessary (due to predication inaccuracy) for the service orchestrator to look too far ahead. A simplistic design, for example, is that at $T_i$ the service orchestrator only decides on what to do at $T_{i+1}$. Each service must be able to express policies such that it can get a fair share of resources. For example, the video on demand service can limit the percentage of sessions to be sped-up. A penalty metric can be associated with each service manipulation mechanism, such that the service orchestrator 14 minimizes such a metric system-wide or on a per-service basis.

Furthermore, it is important to note that the methods described above may incorporate any of the functionality, devices, and/or features of the systems described above and are not intended to be limited to the description provided above. The methodology and techniques described with respect to the exemplary embodiments can be performed using a machine or other computing device within which a set of instructions, when executed, may cause the machine to perform any one or more of the methodologies discussed above. In some embodiments, the first device 12 of the system 10, may be a machine that operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device. The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

In another embodiment of the invention, computer-readable medium may include instructions, which, when loaded and executed by an electronic processor, causes the electronic processor to transfer data between devices. The instructions may include offering multiple services, wherein one or more first offered service is delivery of prerecorded content and at least one second offered service is content delivered according to a deadline. The instructions may also include delivering at least a portion of the first offered service in advance of use of the first offered service such that combined resource demand in connection with delivery of service content of the at least one second offered service at peak delivery is reduced.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A system, comprising:
   a memory that stores instructions;
   a processor that executes the instructions to perform operations, the operations comprising:
      providing multiple services include a first service and a second service, wherein the first service comprises delivery of content and the second service comprises a different service from the first service;
      increasing a content delivery rate for delivering a portion of the first service for a percentage of sessions associated with receiving the first service;
      predicting, based on a periodic arrival of a plurality of requests correlated with the second service, when a request for the second service is to arrive;
      pausing, when the request for the second service is predicted to arrive, a first set of virtual machines utilized for delivering the portion of the first service wherein the first set of virtual machines are paused after increasing the content delivery rate for delivering the portion of the first service;
      determining a minimum number of servers needed for delivering the first and second services based upon a peak of sums of individual workloads corresponding to delivering the first service and the second service, wherein the minimum number of servers determined is less than a total number of servers required for delivering the first service and the second service via separate infrastructures; and
      updating an allocation of resources to be utilized in providing the first service and the second service.

2. The system of claim 1, wherein the operations further comprise delivering the portion of the first service in advance of use of the portion of the first service such that combined resource demand in connection with delivery of service content of the second service at peak delivery is reduced.

3. The system of claim 1, wherein the operations further comprise updating the allocation of resources to be utilized in providing the first service and the second service by executing a scheduled operation for a time bin.

4. The system of claim 3, wherein the operations further comprise updating the allocation of resources to be utilized in providing the first service and the second service by executing a scheduled operation for the time bin, wherein the time bin is divided from a continuous time domain.

5. The system of claim 1, wherein the operations further comprise adjusting resources provided to deliver the second service while delaying delivery of the first service.

6. The system of claim 1, wherein the operations further comprise suspending delivery of the portion of the first service such that demand for resources during delivery of the second service at peak delivery is reduced.

7. The system of claim 1, wherein the operations further comprise determining resource requirements of the first service and the second service.

8. The system of claim 1, wherein the operations further comprise initiating a second set of virtual machines based on demand for the second service.

9. The system of claim 1, wherein the operations further comprise delivering the first service via a unicast stream.

10. The system of claim 1, wherein the operations further comprise delivering the second service via a unicast stream.

11. The system of claim 1, wherein the operations further comprise determining if the content associated with the first service has a playback deadline.

12. The system of claim 1, wherein the operations further comprise adjusting a number of servers needed to meet demand for delivery of the second service.

13. A method, comprising:
   providing multiple services include a first service and a second service, wherein the first service comprises delivery of content and the second service comprises a different service from the first service;
   adjusting, by utilizing instructions from a memory that are executed by a processor, a content delivery rate for delivering a portion of the first service for a percentage of sessions associated with receiving the first service;
   predicting, based on a periodic arrival of a plurality of requests correlated with the second service, when a request for the second service is to arrive;
   pausing, when the request for the second service is predicted to arrive, a first set of virtual machines utilized for delivering the portion of the first service wherein the first set of virtual machines are paused after adjusting the content delivery rate for delivering the portion of the first service;
   determining a minimum number of servers needed for delivering the first and second services based upon a peak of sums of individual workloads corresponding to delivering the first service and the second service, wherein the minimum number of servers determined is less than a total number of servers required for delivering the first service and the second service via separate infrastructures; and
   updating an allocation of resources to be utilized in providing the first service and the second service.

14. The method of claim 13, further comprising delivering the portion of the first service in advance of use of the portion of the first service such that combined resource demand in connection with delivery of service content of the second service at peak delivery is reduced.

15. The method of claim 13, further comprising updating the allocation of resources to be utilized in providing the first service and the second service by executing a scheduled operation for a time bin.

16. The method of claim 13, further comprising adjusting a number of servers needed to meet demand for delivery of the second service.

17. The method of claim 13, further comprising suspending delivery of the portion of the first service such that demand for resources during delivery of the second service at peak delivery is reduced.

18. The method of claim 13, further comprising determining if the content associated with the first service has a playback deadline.

19. The method of claim 13, further comprising determining resource requirements of the first service and the second service.

20. A non-transitory computer-readable medium comprising instructions, which, when loaded and executed by a processor, cause the processor to perform operations, the operations comprising:
   providing multiple services include a first service and a second service, wherein the first service comprises delivery of content and the second service comprises a different service from the first service;

modifying, by utilizing instructions from a memory that are executed by a processor, a content delivery rate for delivering a portion of the first service for a percentage of sessions associated with receiving the first service;

predicting, based on a periodic arrival of a plurality of requests correlated with the second service, when a request for the second service is to arrive;

pausing, when the request for the second service is predicted to arrive, a first set of virtual machines utilized for delivering the portion of the first service wherein the first set of virtual machines are paused after adjusting the content delivery rate for delivering the portion of the first service;

determining a minimum number of servers needed for delivering the first and second services based upon a peak of sums of individual workloads corresponding to delivering the first service and the second service, wherein the minimum number of servers determined is less than a total number of servers required for delivering the first service and the second service via separate infrastructures; and updating an allocation of resources to be utilized in providing the first service and the second service.

* * * * *